United States Patent
Lin et al.

(10) Patent No.: US 7,847,182 B2
(45) Date of Patent: Dec. 7, 2010

(54) SUN TRACKING SYSTEM FOR A SOLAR PANEL

(76) Inventors: Jeffrey Lin, No. 66, Youyi Road, Miaoli, Jhunan (TW); Alan Lin, No. 66, Youyi Road, Miaoli, Jhunan (TW); Cheng-Min Chen, No. 66, Youyi Road, Miaoli, Jhunan (TW)

( * ) Notice: Subject to any disclaimer, the term of this patent is extended or adjusted under 35 U.S.C. 154(b) by 448 days.

(21) Appl. No.: 11/936,312

(22) Filed: Nov. 7, 2007

(65) Prior Publication Data
US 2009/0056700 A1    Mar. 5, 2009

(30) Foreign Application Priority Data
Aug. 27, 2007  (TW) ............................... 96131745 A

(51) Int. Cl.
 *H02N 6/00*      (2006.01)
 *H01L 31/042*    (2006.01)
 *F24J 2/38*      (2006.01)
(52) U.S. Cl. .................. 136/246; 126/600; 126/605
(58) Field of Classification Search ................ 136/246, 136/259; 126/600, 605
See application file for complete search history.

(56) References Cited

U.S. PATENT DOCUMENTS

| 4,053,327 | A | * | 10/1977 | Meulenberg, Jr. | ............ 136/256 |
| 4,316,084 | A | * | 2/1982 | Stout | ........................ 250/203.4 |
| 4,337,758 | A | * | 7/1982 | Meinel et al. | ............... 126/684 |
| 4,672,191 | A | * | 6/1987 | Cofield | .................... 250/203.4 |
| 6,680,693 | B2 | * | 1/2004 | Urban et al. | ........... 342/357.06 |

FOREIGN PATENT DOCUMENTS

ZA              790043      * 11/1979

OTHER PUBLICATIONS

Definition of symmetrical, "Free Merriam-Websters Dictionary," <http://www.merriam-webster.com/dictionary/symmetrical> accessed Feb. 17, 2010.*

* cited by examiner

*Primary Examiner*—Jeffrey T Barton
*Assistant Examiner*—Allison Bourke

(57) ABSTRACT

A sun tracking system includes a first, and a second photo sensors, separately mounted on a solar panel on two positions apart from one another and symmetrical with respect to a center of the panel. A first sleeve surrounds the first photosensor; a second sleeve surrounds the second photosensor. Each of the sleeves has an inclined opening with reference to the surface of the panel.

18 Claims, 5 Drawing Sheets

SUN TRACKING SYSTEM FOR A SOLAR PANEL

RELATED APPLICATIONS

The present application is based on, and claims priority date from, Taiwan Application Serial Number 096131745, filed Aug. 27, 2007, the entire disclosure of which is incorporated by reference herein.

TECHNICAL FIELD

This disclosure relates to a sun tracking system for a solar panel that collects and converts solar energy into electricity or heat.

BACKGROUND

FIG. 1 Prior Art

FIG. 1 shows a solar panel 105 has a conventional sun tracking system on it. The tracking system comprises four photo sensors 101,102,103,104 encircled by a sleeve 120. The four sensors locate in the center of the top surface of the solar panel 105. Photoelectric units 108 for collecting and converting solar energy into electricity are distributed on the top surface of the solar panel 105. The sleeve 120 has an opening for detecting the shift direction and distance of the movement of the sun through detecting the light intensity irradiating on each of the sensors. The traditional sleeve 120 has a wall with even height erected from the surface of the solar panel 105.

When the sun is above the solar panel 105, the light rays from the sun irradiate directly onto the solar panel 105, each of the four photo sensors is presumed to receive equal heat strength, or light intensity, from the sun. However, when the sun shifts left as shown in FIG. 1. the light rays below R1 are hindered by the wall and prevented from reaching to the photo sensors 101,102,103,104. A shadow is produced within the sleeve under R1, the shadow shall cover partially the photo sensors in the beginning and hence the light intensities sensed by the photo sensors are different from one another. FIG. 1 shows that sensor 101 is fully covered by the shadow, and sensors 102, 104 are partially covered by the shadow.

The light intensity of each of the photo sensors is sensed and transferred to a control unit (not shown). A mechanism deflects the solar panel 105 a calculated angle according to the information received from the control unit so that the solar panel 105 moves synchronically with the movement of the sun to receive relatively more solar energy.

The drawback of the prior art as shown in FIG. 1 is that the environmental light intensity of photo sensor 101 increases a little more than it should be by light reflection disturbance. See FIG. 1, a light ray R2 projects on the wall surface inside the sleeve 120 to produce a reflection light that directs to the sensor 101 to offset partially of the shadow covering the sensor 101 and thus decrease the light intensity around sensor 101.

DETAILED DESCRIPTION

Figure 1:
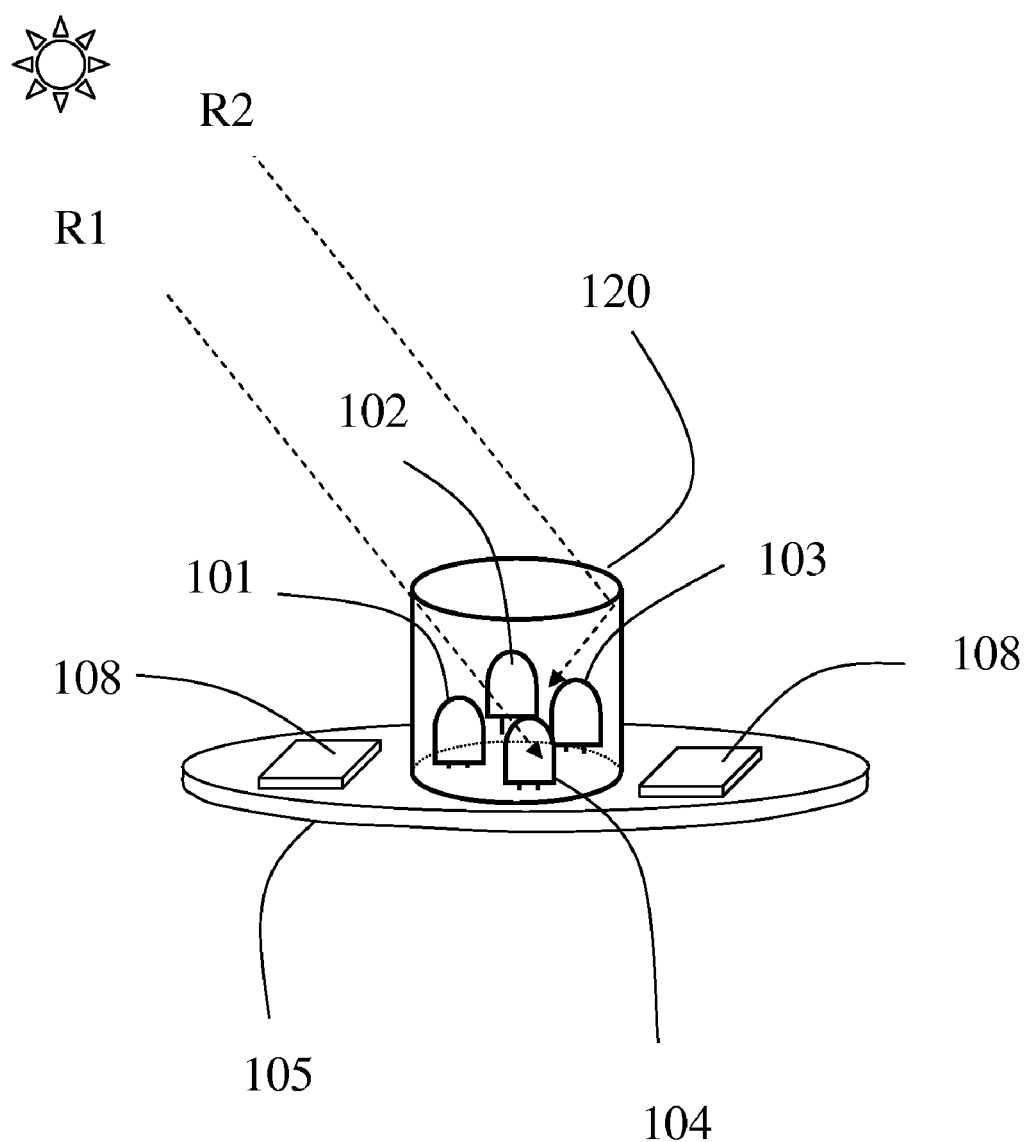
FIG. 1 shows a prior art system.
Figure 2:
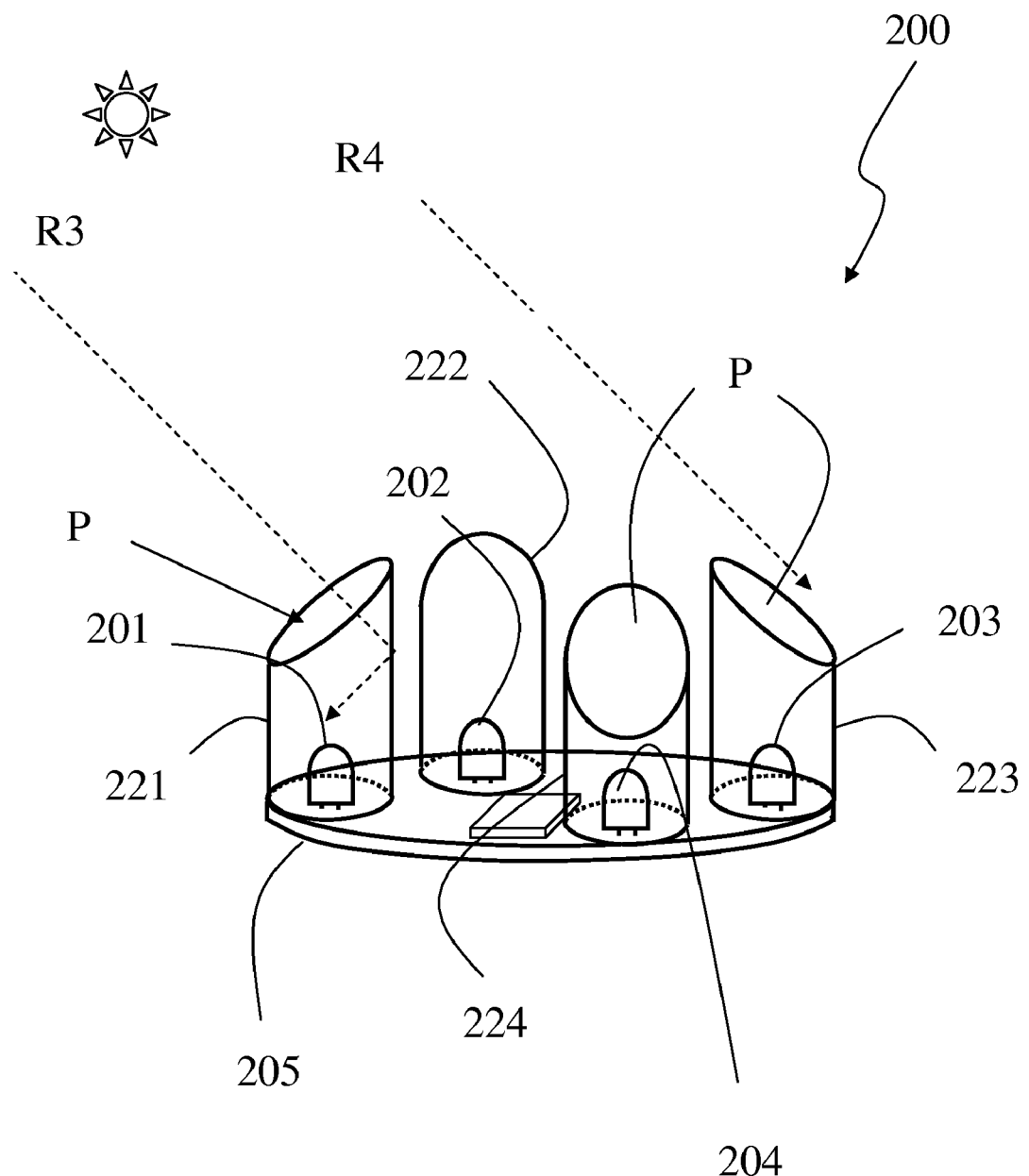
FIG. 2 shows a first embodiment of a detection system according to this invention.

FIG. 2 shows a first embodiment of this invention.

A sun tracking system 200 mounted on a solar panel 205. A plurality of photo-electricity conversion devices 108 are mounted on the solar panel for collecting and converting solar energy into electricity or heat. Four photo sensors 201,202, 203,204 each being arranged on one of the four cardinal directions on the periphery of solar panel 205. Each of the four sensors is encircled by a corresponding sleeve of the four sleeves 221,222,223,224. Each of the sleeve erects from the top surface of the solar panel 205, and each has a skewed opening P with reference to the top surface of the solar panel 205. The four sleeves 221,222,223,224 are back to back arranged so that each of the four sleeves has its opening oriented towards one of the four cardinal directions.

Referring to FIG. 2, when the sun moves left, light reflection is eliminated for light ray R4 that is parallel with, and above, the skewed opening. No light reflection disturbance from light ray R4 occurs to the environment of sensor 203. In the meanwhile, a light reflection is generated from light ray R3 to brighten the environment of sensor 201. This structure enlarges the difference of the environmental brightness between sensor 201 and sensor 203 and hence enhances the detection sensitivity in the direction along sensor 201 and sensor 203 of the tracking system.

Figure 3:
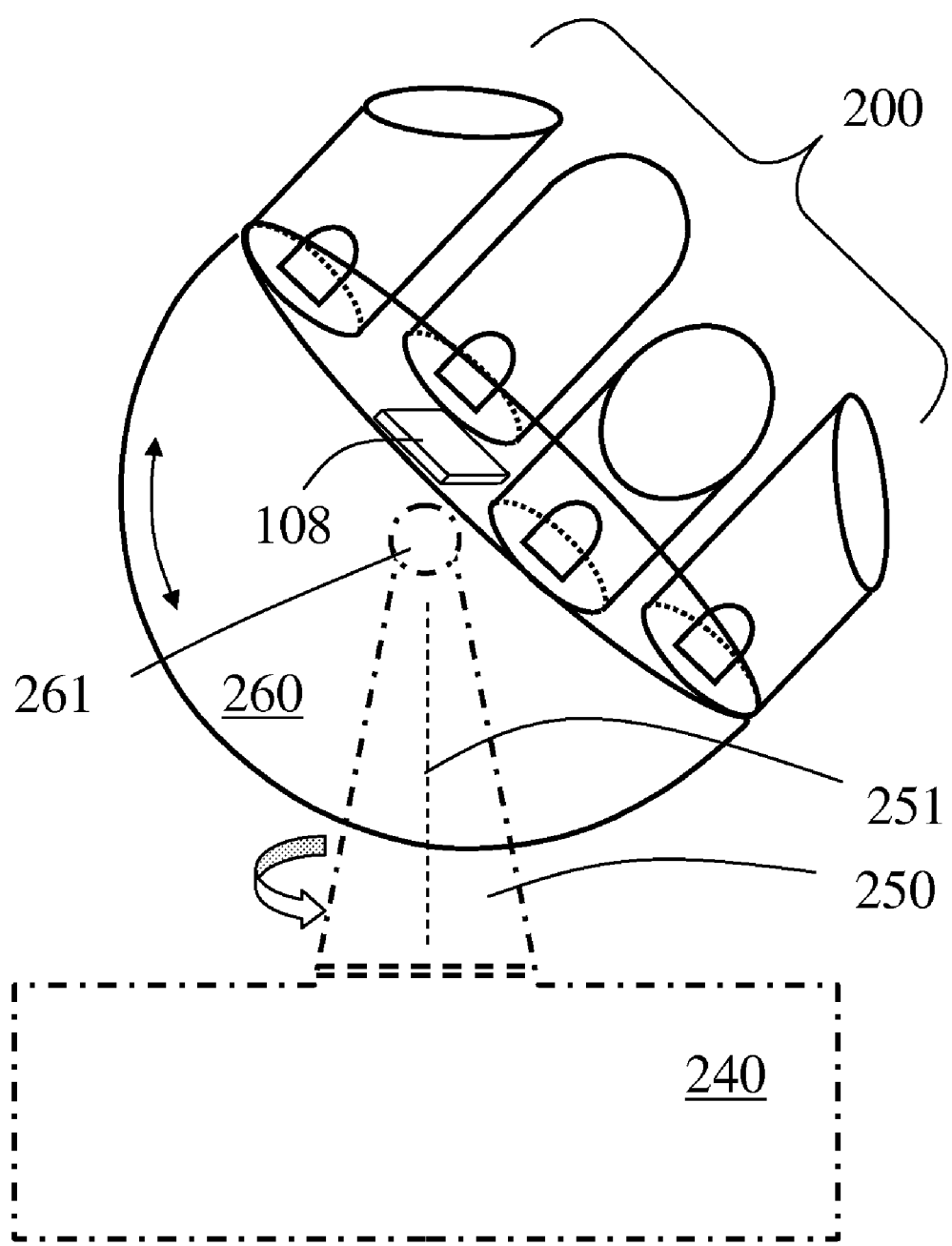
FIG. 3 shows a rotation mechanism used in this invention.

FIG. 3. shows a rotation mechanism used in this invention.

FIG. 3 illustrates a rotation mechanism that can be used in connection with the sun tracking system 200 of this invention. The sun tracking system 200 is mounted on a first pedestal 260 with a rotation axis 261, the system 200 is able to rotate about axis 261. The axis 261 is further rotatably mounted on a second pedestal 250 that is rotatably fastened on a stationary object 240 with a rotation axis 251. The second pedestal 250 is able to rotate about axis 251. Step motors (not shown) can be used to control the rotation of the first pedestal 260 and second pedestal 250 so as to adjust the solar panel facing to the sun.

Figure 4:
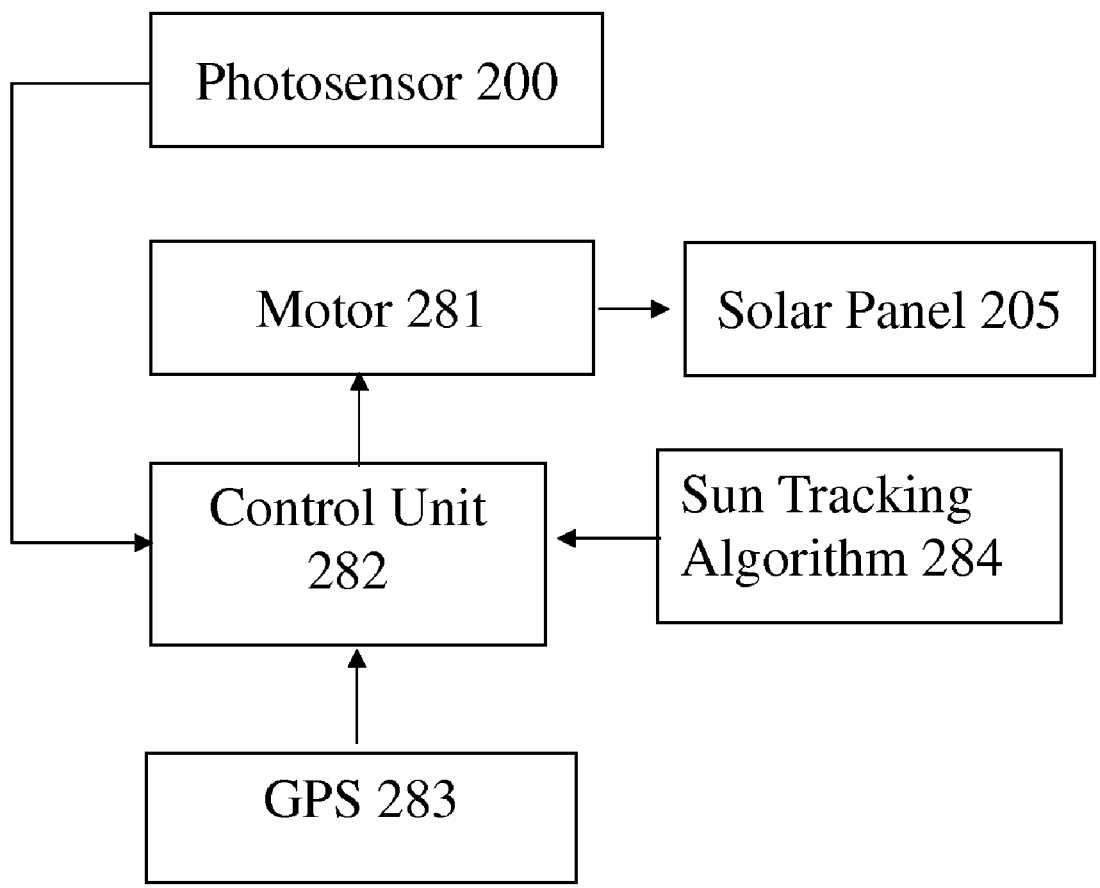
FIG. 4 shows a block diagram according to embodiments of this invention.

FIG. 4. shows a System Block Diagram for embodiments of the Invention.

Photo-sensor 200 feeds sensing data to control unit 282, control unit 282 couples to motor 281 to adjust the direction of the solar panel 205. Sun tracking algorithm 284 is optionally coupled to control unit 282 to automatically adjust the direction of the tracking system 200 according to a predetermined route. Global positioning system (GPS) is an option for coupling to control unit 282 to automatically correct the coordinates of the tracking system 200 so that control unit 282 can select a route to follow from a database of predetermined routes based on the information fed from GPS 283.

Figure 5:
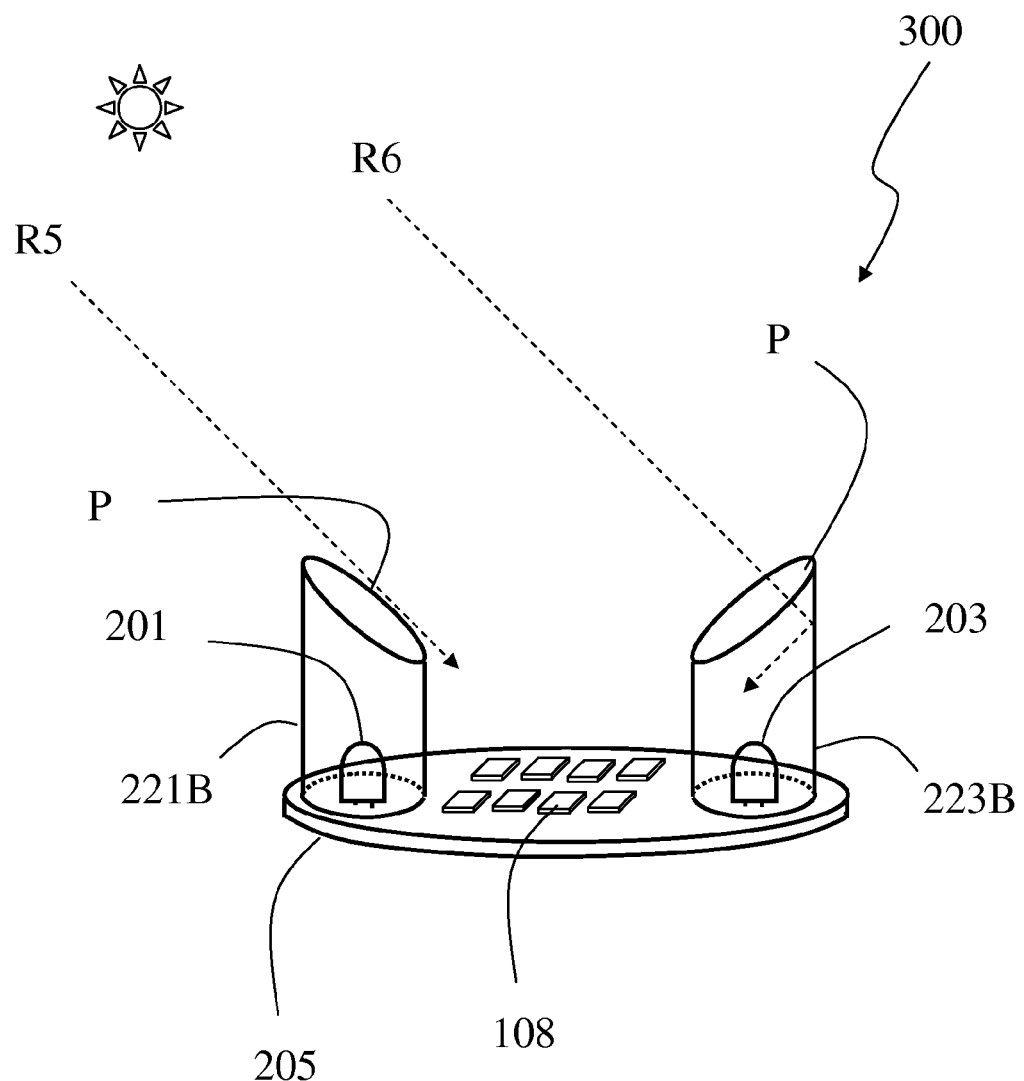
FIG. 5 shows a second embodiment of a modified detection system according to this invention.

FIG. 5 shows a second embodiment of this invention.

The principle is similar to what has been described in FIG. 2, the only difference being that the sleeves' direction has been changed. FIG. 2 shows that the sleeves 221,223 have their skewed openings P oriented back to back, however, FIG. 5 shows that the sleeves 221B, 223B have their skewed openings P face to face. When the sun deviates to the left as shown in FIG. 5, light rays above R5 pass sleeve 221B and never enter sleeve 221B, in the meanwhile, some of light rays below R6 enter the sleeve 223B, therefore the environment of sensor 203 is brighter than the environment of sensor 201. With this information, the solar panel 205 needs adjustment to rotate a little clockwise.

For a better efficiency, a lens (not shown) can be arranged on top of said photo-electricity conversion elements 108, for collecting and directing more sun light rays onto said photo-electricity conversion elements 108.

While several embodiments have been described by way of example, it will be apparent to those skilled in the art that various modifications may be made in the embodiments without departing from the spirit of the present invention. Such modifications are all within the scope of the present invention, as defined by the appended claims.

What is claimed is:

1. A sun tracking system for a solar panel, said sun tracking system comprising:
   a first sensor, located on a first location of said panel;
   a second sensor, located on a second location of said panel, wherein said first and second locations are symmetrical with respect to a center of said panel;
   a first sleeve, encircling said first sensor, and having a first skewed opening oriented in a first direction, and
   a second sleeve, encircling said second sensor, and having a second skewed opening oriented in a second direction opposite to the first direction; and at least one photo-electricity conversion element positioned between said first and second sensors for collecting and converting solar energy into electricity or heat.

2. A sun tracking system as claimed in claim 1, wherein said first skewed opening is oriented away from the second sensor and said second skewed opening is oriented away from the first sensor.

3. A sun tracking system as claimed in claim 1, wherein said first skewed opening is oriented toward the second sensor and said second skewed opening oriented toward the first sensor.

4. A sun tracking system as claimed in claim 1, further comprising:
   a step motor coupled to said panel; and
   a control unit coupled to said step motor for controlling said step motor to adjust an orientation of said panel in response to signals received from said sensors.

5. A sun tracking system as claimed in claim 4, wherein said control unit is programmed with a sun tracking algorithm that provides predetermined parameters to said control unit to control the orientation adjustment of said panel.

6. A sun tracking system as claimed in claim 4, further comprising:
   a global positioning system coupled to said control unit for providing coordinates of said system to said control unit.

7. A sun tracking system as claimed in claim 1, wherein said solar panel comprises a plurality of said photo-electricity conversion elements positioned between said first and second sensors for collecting and converting solar energy into electricity or heat.

8. A sun tracking system as claimed in claim 7, wherein said solar panel further comprises:
   a lens, on top of each of said photo-electricity conversion elements, for collecting sun light onto said respective photo-electricity conversion element.

9. A sun tracking system as claimed in claim 1, further comprising:
   a third sensor, located on a third location of said panel;
   a fourth sensor, located on a fourth location of said panel, wherein said third and fourth locations are symmetrical with respect to the center of said panel;
   a third sleeve, encircling said third sensor, and having a third skewed opening oriented in a third direction, and
   a fourth sleeve, encircling said fourth sensor, and having a fourth skewed opening oriented in a fourth direction opposite to the third direction;
   each of said first through fourth directions being a different one of the cardinal directions.

10. A sun tracking system as claimed in claim 9, wherein said photo-electricity conversion element is surrounded by said first through fourth sensors.

11. A sun tracking system as claimed in claim 9, wherein said first skewed opening is oriented away from the second sensor and said second skewed opening is oriented away from the first sensor; and
    said third skewed opening is oriented away from the fourth sensor and said fourth skewed opening is oriented away from the third sensor.

12. A solar panel, comprising:
    first and second sensors located on said panel;
    at least a photo-electricity conversion element positioned on said panel between said first and second sensors for collecting and converting solar energy into electricity or heat
    a first sleeve encircling said first sensor and having a first skewed opening oriented in a first direction, and
    a second sleeve encircling said second sensor and having a second skewed opening oriented in a second direction opposite to the first direction.

13. A solar panel as claimed in claim 12, wherein said first skewed opening is oriented away from the second sensor and said second skewed opening is oriented away from the first sensor.

14. A solar panel as claimed in claim 12, wherein said first skewed opening is oriented toward the second sensor and said second skewed opening oriented toward the first sensor.

15. A solar panel as claimed in claim 12, further comprising:
    third and fourth sensors located on said panel to be 90 degrees apart from the first and second sensors;
    a third sleeve encircling said third sensor and having a third skewed opening oriented in a third direction, and
    a fourth sleeve encircling said fourth sensor and having a fourth skewed opening oriented in a fourth direction opposite to the third direction.

16. A solar panel as claimed in claim 15, wherein each of said first through fourth directions being a different one of the cardinal directions.

17. A solar panel as claimed in claim 15, wherein said first skewed opening is oriented away from the second sensor and said second skewed opening is oriented away from the first sensor; and
    said third skewed opening is oriented away from the fourth sensor and said fourth skewed opening is oriented away from the third sensor.

18. A solar panel as claimed in claim 15, wherein said photo-electricity conversion element is surrounded by said first through fourth sensors.

\* \* \* \* \*